(12) United States Patent
Maeda et al.

(10) Patent No.: US 7,085,620 B2
(45) Date of Patent: Aug. 1, 2006

(54) SERVO CONTROLLER (75) Inventors: Kazuomi Maeda, Yamaga (JP); Yasusuke Iwashita, Fujiyoshida (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/128,382

(22) Filed: May 13, 2005

(65) Prior Publication Data
US 2005/0256605 A1  Nov. 17, 2005

(30) Foreign Application Priority Data
May 17, 2004  (JP)  ............................. 2004-146482

(51) Int. Cl.
*G06F 19/00* (2006.01)
*G05B 19/18* (2006.01)

(52) U.S. Cl. ................... 700/193; 173/188; 318/571

(58) Field of Classification Search ............... 700/56, 700/61, 173, 174, 188, 189, 193; 318/571, 318/573
See application file for complete search history.

(56) References Cited

U.S. PATENT DOCUMENTS

| | | | |
|---|---|---|---|
| 4,970,447 A * | 11/1990 | Kamiguchi et al. | ......... 318/567 |
| 5,019,763 A * | 5/1991 | Komatsu | ................ 318/571 |
| 5,773,938 A | 6/1998 | Seong et al. | |
| 6,046,566 A * | 4/2000 | Sonoda et al. | ............ 318/625 |
| 6,889,115 B1 * | 5/2005 | Shiba et al. | ............... 700/186 |
| 6,909,938 B1 * | 6/2005 | Hishikawa et al. | ......... 700/188 |
| 2005/0085939 A1 * | 4/2005 | Nakazato et al. | ........... 700/173 |

FOREIGN PATENT DOCUMENTS

| | | |
|---|---|---|
| EP | 0 913 749 | 5/1999 |
| JP | 6-309021 | 11/1994 |
| JP | 7-104823 | 4/1995 |

OTHER PUBLICATIONS

EP Search Report for corresponding application EP 05 25 299.4-22061 dated Aug. 12, 2005.
Job van Amerongen, "Mechatronic design", MECHATRONICS, vol. 13, No. 10, pp. 1045-1066, 2003.

* cited by examiner

*Primary Examiner*—Leo Picard
*Assistant Examiner*—Douglas S. Lee
(74) *Attorney, Agent, or Firm*—Staas & Halsey LLP (57) ABSTRACT In response to a learning control start command from an external apparatus, an input switch for inputting a position deviation to learning control means and an output switch for outputting correction data from the learning control means are turned on, respectively, so that a position deviation is captured for each period. The position deviation is added to correction data fetched from a learning memory, and the result is stored as correction data in the learning memory. On the other hand, a value obtained by compensating the correction data fetched from the learning memory with a dynamic characteristic compensation element is added to the position deviation, and the result is inputted to a position control section. When a learning control end command is issued after the termination of a command pattern for an identical shape, the input switch and output switch are turned off, respectively.

9 Claims, 9 Drawing Sheets

FIG.9

SERVO CONTROLLER

BACKGROUND OF THE INVENTION

1. Field of the Invention

The present invention relates to a servo controller for driving feed axes and rotation axes of drive mechanisms for machine tools, injection molding machines, press machines, etc., and more particularly, to a servo controller suited for a case where identical parts continue to be machined many times in a machine tool for parts machining.

2. Description of the Related Art

Figure 2:
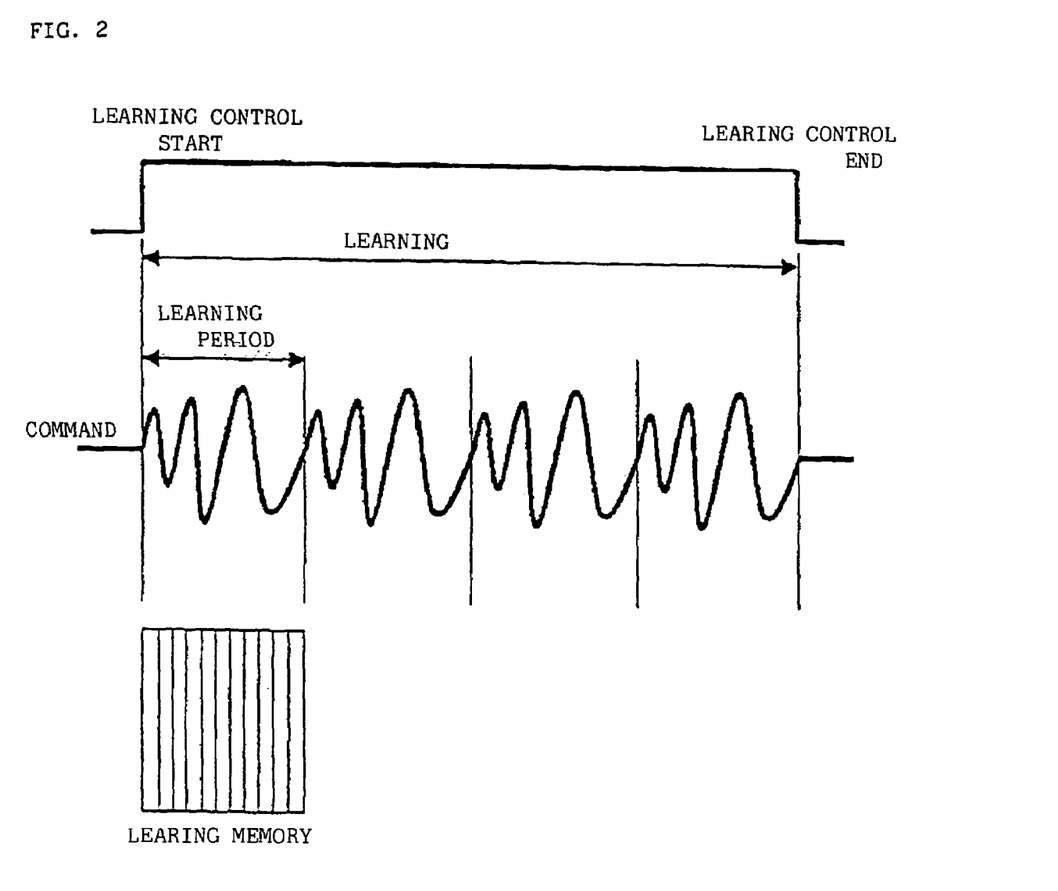
FIG. 2 is a diagram for illustrating conventional learning control (repeated control)

Learning control is known as a method to converge a control deviation to near zero, thereby improving the machining accuracy, in performing machining or the like in response to commands of identical patterns that are issued repeatedly. In this conventional learning control, as shown in FIG. 2, the identical patterns are repeatedly issued in fixed pattern periods. Correction data that is obtained in accordance with a position deviation in each control period in a preceding pattern period is previously stored in a learning memory. The position deviation is converged to zero by adding correction data for a control period corresponding to the preceding pattern period stored in the learning memory to the position deviation for each control period for the pattern period concerned (see Japanese Patent Applications Laid-open Nos. 7-104823 and 6-309021, for example).

The aforesaid learning control is applied to the case of a piston lathe in which commands are repeatedly executed for identical patterns for a profile. However, this learning control is not applicable to a case where the identical patterns are not repeatedly executed.

The learning control cannot be applied to a case where a lot of identical parts continue to be machined or identical shapes must be intermittently machined many times, although commands for machining the identical shapes have identical command patterns.

SUMMARY OF THE INVENTION

According to the present invention, there is provided a servo controller for driving a servomotor in accordance with a command inputted from a host controller. The servo controller comprises learning control means which includes a learning memory, storing correction data obtained in accordance with a position deviation between a command position inputted from the host controller and a detected position of a driven body driven by the servomotor, and performs learning control by correcting the position deviation in accordance with the correction data stored in the learning memory. Further, the learning control means discriminates a learning control start command and a learning control end command inputted from any other external apparatus than the host controller and updates and stores the correction data in the learning memory with every given period as the servomotor is driven during a time interval from the learning control start command to the learning control end command. The drive of the servomotor during the time interval from the learning control start command to the learning control end command is subjected to learning control based on a position command inputted from the host controller and the correction data for each given period stored in the learning memory. The servo controller further comprises means for obtaining an evaluation value of the position deviation for evaluating the learning control in accordance with the position deviation value, and the learning control is evaluated from the evaluation value.

The servo controller may be characterized by the following.

The servo controller further comprises means for issuing an alarm to the host controller when the evaluation value of the position deviation exceeds a given range after once entering the given range.

The servo controller further comprises means which stops renewal of the correction data when the position deviation or the evaluation value of the position deviation enters a given range and restarts the renewal of the correction data when the given range is exceeded.

The servo controller further comprises means which informs the host controller of a convergence of the position deviation and transfers the correction data to the host controller when the evaluation value of the position deviation enters a given range.

The servo controller further comprises means for comparing a stored reference evaluation value of the position deviation with a current evaluation value of the position deviation after the end of the learning control or an operational program, and means which stores a current evaluation value of the position deviation as the reference evaluation value and a current correction data as reference correction data, or transfer these data to the host controller for storing these data in the storage device in the host controller, in case where the current evaluation value of the position deviation is small, and loads the correction data stored in the servo controller or the host controller into the learning memory, in case where the current evaluation value of the position deviation is large.

The evaluation value of the position deviation is a mean square value of the position deviation, a mean of absolute values of position deviations, or a maximum of the absolute values of the position deviations.

The evaluation value of the position deviation is obtained using a position deviation for a time interval between a point of time in a given time after the start of the learning control and a point of time in a given time before the end of the learning control.

The evaluation value of the position deviation is obtained using a position deviation between a monitoring start command and a monitoring end command inputted from the host controller or any other external apparatus than the host controller.

In the servo controller of the invention arranged in this manner, the learning control can be also applied to a case where identical shapes are machined many times, and the result of the learning control can be evaluated. In machining a lot of parts of the same shape, in particular, the learning control may be applied to those parts so that a position deviation in the machining converges to zero. Thus, the machining can be performed with high accuracy.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
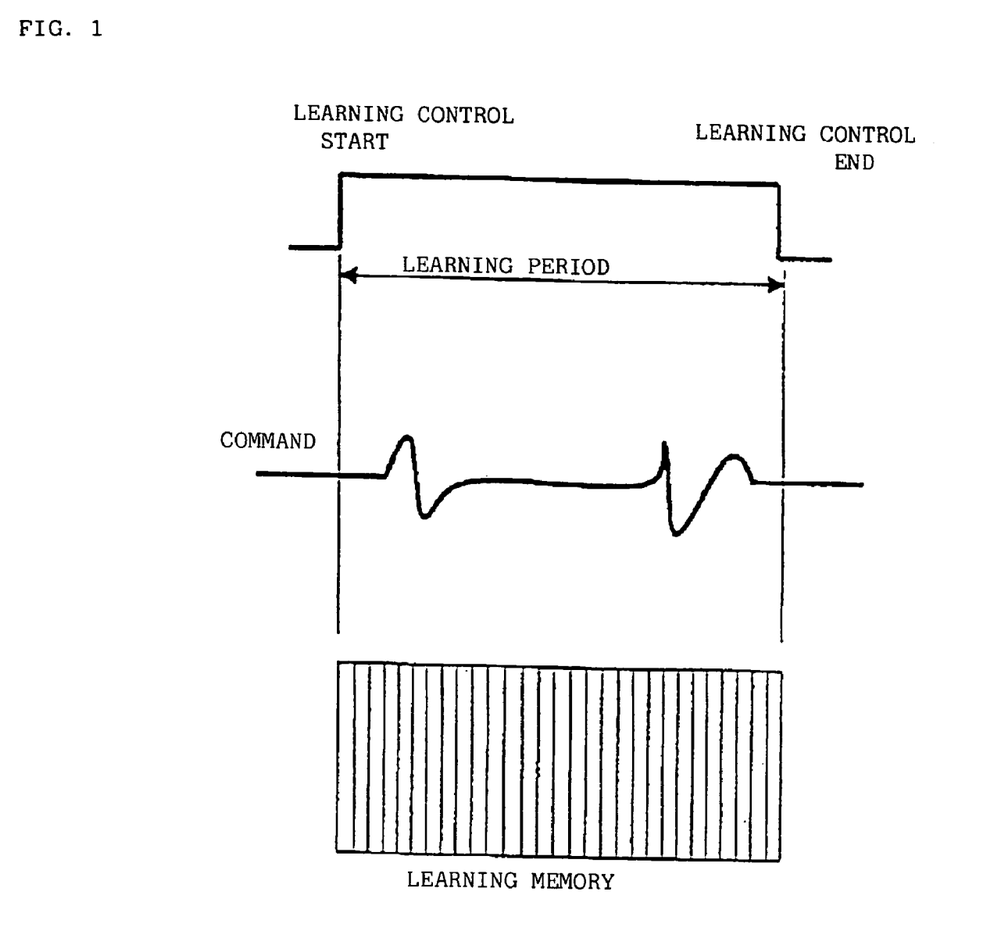
FIG. 1 is a diagram for illustrating the principle of the invention.

FIG. 1 is a diagram for illustrating the principle of the present invention. According to the invention, learning control is applied to parts or portions to be machined for an identical shape. A learning control start command is given from a command position for the identical command pattern, and a learning control end command is given at a position where the identical command pattern terminates. The learning control is performed for a period between the learning control start command and the learning control end command. This learning control is applied to the case where a plurality of identical parts is machined or workpieces of a plurality of identical shapes are worked.

In conventional learning control shown in FIG. 2, a learning memory is stored with correction data formed of position deviation data for one pattern period of repeated identical command patterns. In the next pattern period, the correction data stored in the learning memory is added to a position deviation so that the position deviation is zero.

According to the present invention, however, a learning memory is previously stored with correction data formed of position deviation data for a learning section from a learning control start command to a learning control end command where identical command patterns are issued. In the next learning section from the learning control start command to the learning control end command, the position deviation is corrected with corresponding correction data stored in the learning memory, and the learning memory is stored with new correction data.

Figure 3:
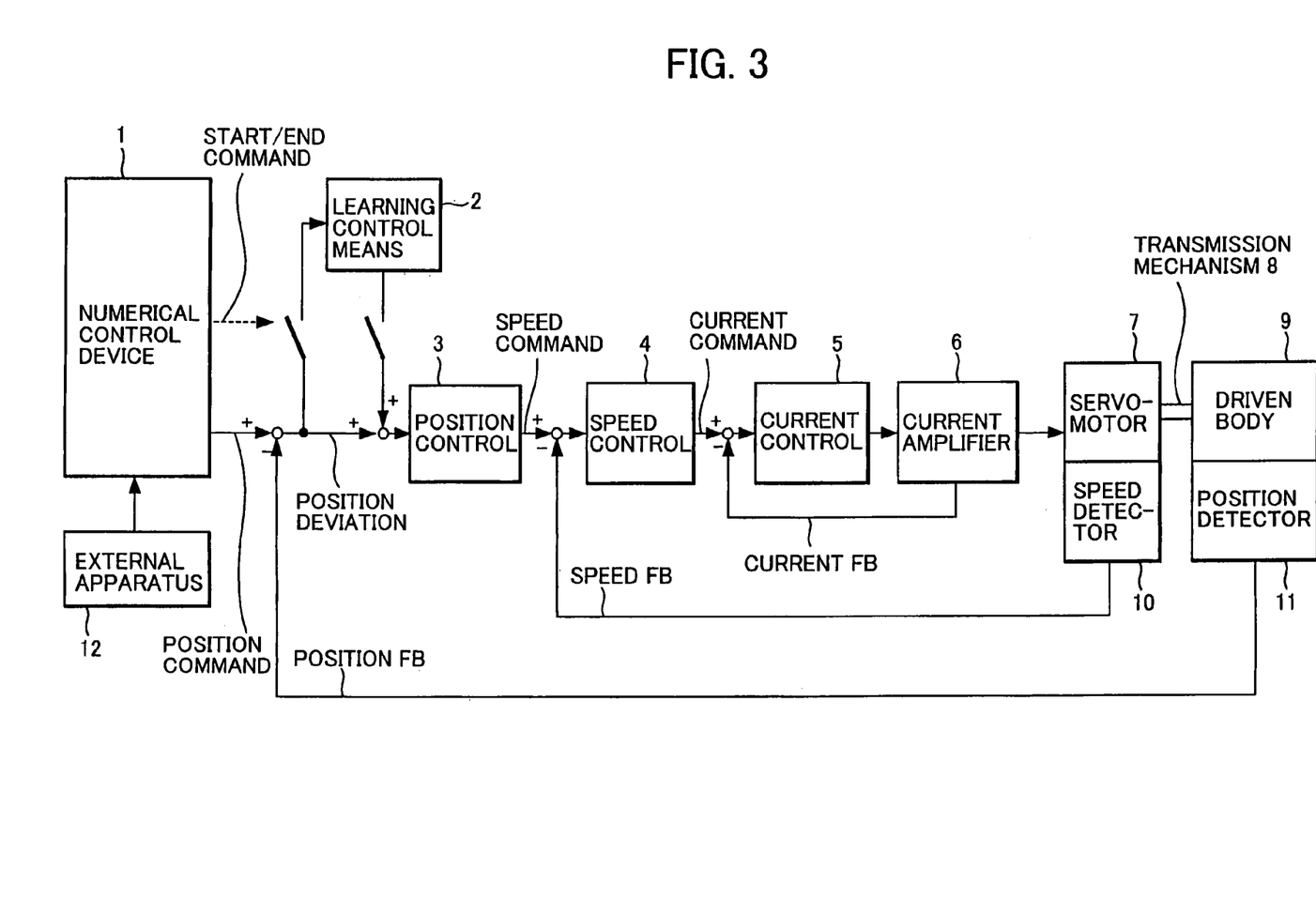
FIG. 3 is a schematic block diagram of a servo controller according to each embodiment of the invention.

FIG. 3 is a schematic block diagram showing one embodiment of the present invention. Based on a machining program or the like, a numerical control device 1, a host controller, delivers a position command to a servo controller for a servomotor 7, which drivingly controls a driven body 9. The servo controller feedback-controls the position, speed, and current in accordance with the position command and drivingly controls the servomotor 7.

More specifically, the position deviation is obtained by subtracting a present position fed back from a position detector 11 for detecting the moved position of the driven body 9 from the position command delivered from the numerical control device 1. A speed command is obtained by multiplying the position deviation by a position loop gain in a position control section 3. Further, a speed deviation is obtained by subtracting from the speed command an actual speed fed back from a speed detector 10 that is attached to the servomotor 7 and detects the speed of the servomotor 7. In a speed control section 4, speed loop control, such as PI (proportional plus integral) control, is performed to obtain a current command (torque command). Further, a current deviation is obtained by subtracting from the current command a driving current that is fed back from a current amplifier 6. Current loop control is performed in a current control section 5, the servomotor 7 is drivingly controlled by the current amplifier 6, and the driven body 9 is driven by a transmission mechanism 8.

The above configuration is identical with a conventional servo controller that involves position, speed, and current loop control. The servo controller according to the present invention differs from the conventional servo controller in that it is additionally provided with learning control means 2. The learning control means 2 starts learning control in response to the learning control start command and stops the learning control in response to the learning control end command. According to this embodiment, the learning control start and end commands are issued from an external apparatus 12 that is connected to the numerical control device 1. The external apparatus 12 may be a programmable logic controller, limit switch, sizing device, measuring device such as a laser measuring device, or personal computer or other control device connected by means of a communication line, such as an Ethernet (registered trademark) line or private line.

Figure 4:
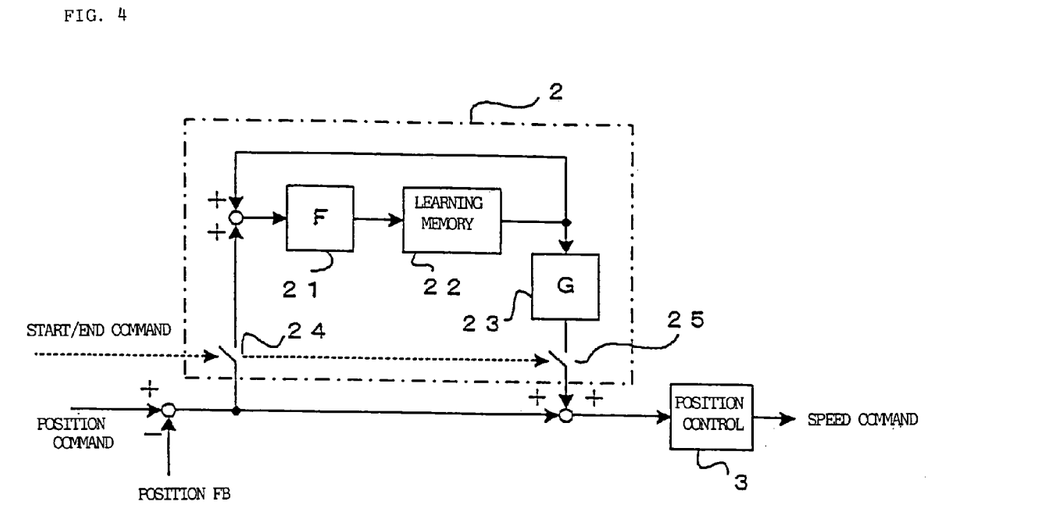
FIG. 4 is a detailed block diagram of learning control means of the servo controller of FIG. 3.

FIG. 4 is a detailed block diagram of the learning control means 2. The learning control means 2, like the conventional learning control means, comprises a band-limiting filter 21, a learning memory 22 stored with correction data, and a dynamic characteristic compensation element 23, which compensates for a phase delay and gain reduction of an object of control. Further, the present invention is characterized by an input switch 24 for inputting the position deviation to start and stop the learning control and an output switch 25 for outputting the correction data.

The learning memory 22 is provided with a number of memories which corresponds to the number of periods in which position and speed loop controls are executed in an identical command pattern to be learned. The number of periods may be set together with the learning control start command. If the number of periods is not set, an enough value may be previously set in a first period so that the number of periods can be settled in accordance with a time interval (count number for the given processing period) between a start command and an end command in the first period. If the correction data is transferred from a storage device as the host controller to the learning control means 2, the number of periods can be transferred at the same time. If the section of the identical command pattern and the position and speed loop processing period are L and T, respectively, the learning memory 22 is provided with L/T number of memories.

When the learning control start command is issued from the numerical control device 1, the switches 24 and 25 are closed. The learning control means 2 captures the position deviation through the input switch 24 with every given period for the position and speed loop control. The oldest correction data that is stored in the learning memory 22 is added to the position deviation, the result is processed with the band-limiting filter 21, and is loaded into the learning memory 22 as a correction data. Further, the oldest correction data fetched from the learning memory 22 is subjected to compensation for the phase delay and gain reduction of the object of control by the dynamic characteristic compensation element 23, added to the position deviation (position command-position feedback value) by the switch 25, and inputted to the position control section 3. The output (position deviation to which the correction data is added) of the position control section 3 is multiplied by the position loop gain, whereupon the speed command is obtained. Thereafter, this processing operation is executed until the learning control end command is issued from the numerical control device 1 so that the switches 24 and 25 are turned off after the end of the command for the identical command pattern. Thus, the learning memory 22 is stored with the correction data for each position and speed control processing period in the section for the identical command pattern.

In the identical command pattern section, the position deviation converges to zero as the correction data is added to the position deviation.

In executing the learning control with use of the then correction data without renewal after the position deviation converges to near zero, moreover, the switch 24 is turned off, while the output switch 25 is tuned on.

In the present embodiment, the learning control start and end are controlled in response to a signal from the external apparatus 12 that is connected to the numerical control device 1 as the host controller of the servo controller through an I/O unit or the like. The external apparatus 12 includes the programmable logic controller, limit switch, sizing device, measuring device such as a laser measuring device, or personal computer or other control device connected by means of a communication line, such as an Ethernet (registered trademark) line or private line.

In the present embodiment, moreover, an evaluation by using a positional deviation is carried out so as to determine whether or not the positional deviation is reduced by the learning control so that an actual position follows and converges to the command position. Approach and escape portions for machining in the identical command pattern section from the learning control start command to the learning control end command need not be evaluated, since they have nothing to do with the machining accuracy. If there are any other portions than the approach and escape portions in which a move command changes suddenly, e.g., portions immediately after the learning control start and before the learning control end, a time interval from the point of time of passage of a given time after the learning control start to a point of time corresponding to a given time before the learning control end can be set as a monitoring section for the evaluation of the learning control, with the portions in which the move command drastically changes excluded.

Further, the monitoring section can be set by a signal from the host controller or the external apparatus that is separate from the host device.

Figure 5:
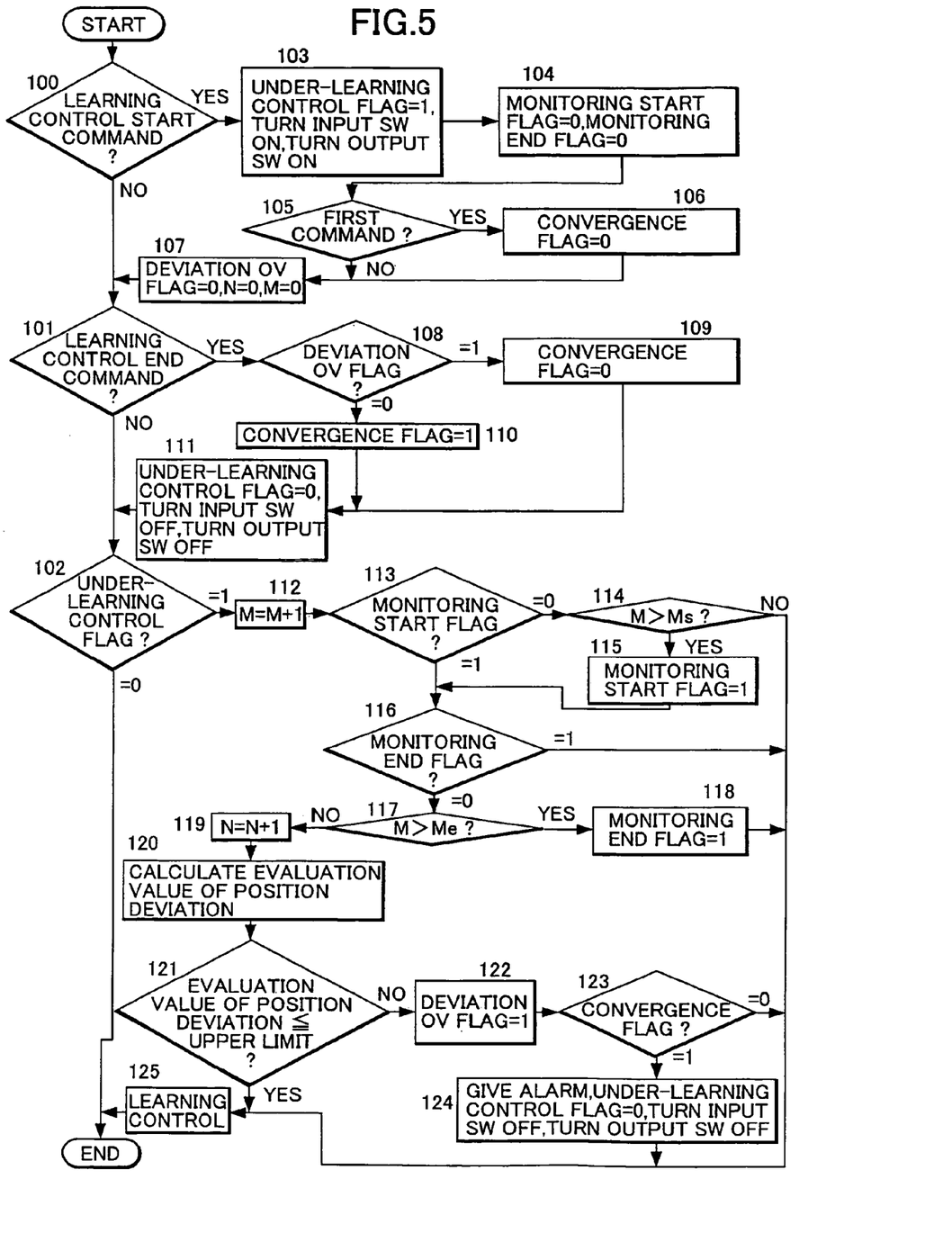
FIG. 5 is a flowchart showing processing for learning control and evaluation for the learning control according to a first embodiment of the present invention.

FIG. 5 is a flowchart showing processing for learning control and evaluation for the learning control according to a first embodiment of the present invention. This processing is carried out by a processor for learning control (processor that executes processing for the servo controller or dedicated processor for the learning control means) for each sampling period (position and position loop processing period) in which a position deviation is captured.

First, it is determined whether or not the learning control start command is issued from the external apparatus 12 through the numerical control device 1 (Step 100), whether or not the learning control end command is issued (Step 101), and whether or not a flag indicating that a learning control is being carried out is "1" (Step 102). If the learning control start command is issued from the external apparatus 12, the flag indicating that a learning control is being carried out is set to "1", the input switch 24 for inputting a position deviation to the learning control means 2 is turned on, and the output switch 25 for outputting correction data from the learning control means 2 is turned on (Step 103).

Then, a monitoring start flag and a monitoring end flag for controlling the execution of monitoring for the evaluation of the learning control are set to "0" (Step 104), and it is determined whether or not this learning control start command is a first command (Step 105). Whether or not the start command is the first one is determined by determining whether or not the correction data has already been stored in the learning memory 22. If the start command is the first command, a convergence flag is set to "0" (Step 106), whereupon the program advances to Step 107. If not, on the other hand, the program proceeds from Step 105 to Step 107, in which a deviation OV flag and counters N and M are cleared, respectively. Thereupon, the program proceeds to Step 101.

If it is concluded that the under-learning control flag, which indicates that learning control is being carried out, is "1", the value of the counter M that counts the number of processing periods during the learning control is incremented by 1 (Step 112), and it is then determined whether or not the monitoring start flag is "0" (Step 113). Since the monitoring start flag is first set to "0" in Step 104, the program proceeds to Step 114, in which it is determined whether or not a preset value Ms for the start of monitoring is exceeded by the value of the counter M. The way of setting this preset value Ms will be described later. If the preset value Ms is not exceeded by the value of the counter M, the program proceeds to Step 125. Learning control processing in Step 125 is set so that the input switch 24 for inputting a position deviation to the learning control means 2 and the output switch 25 for outputting the correction data from the learning control means 2 are turned on respectively in Step 103. Therefore, the correction data is updated by means of the switches 24 and 25 as it is outputted for the execution of the learning control.

Since the under-learning control flag is set to "1" in the next and subsequent periods, processing in Step 100, 101, 102, 112, 113, 114 and 125 is executed for the learning control. If the value of the counter M exceeds the preset value Ms in Step 114, the monitoring start flag is set to "1" (Step 115), and it is determined whether the monitoring end flag is "0" or "1" (Step 116). Since the end flag is initially set to "0" in Step 104, the program proceeds to Step 117, in which it is determined whether or not a preset value Me for the end of monitoring is exceeded by the value of the counter M. The way of setting this preset value Me will be described later. Initially, the preset value Me is not exceeded by the value of the counter M, so that the program proceeds to Step 119, in which the value of the counter N that counts the number of position deviation values to be evaluated is incremented by 1, and a calculation is made to obtain an evaluation value of the position deviation (Step 120).

Figure 9:
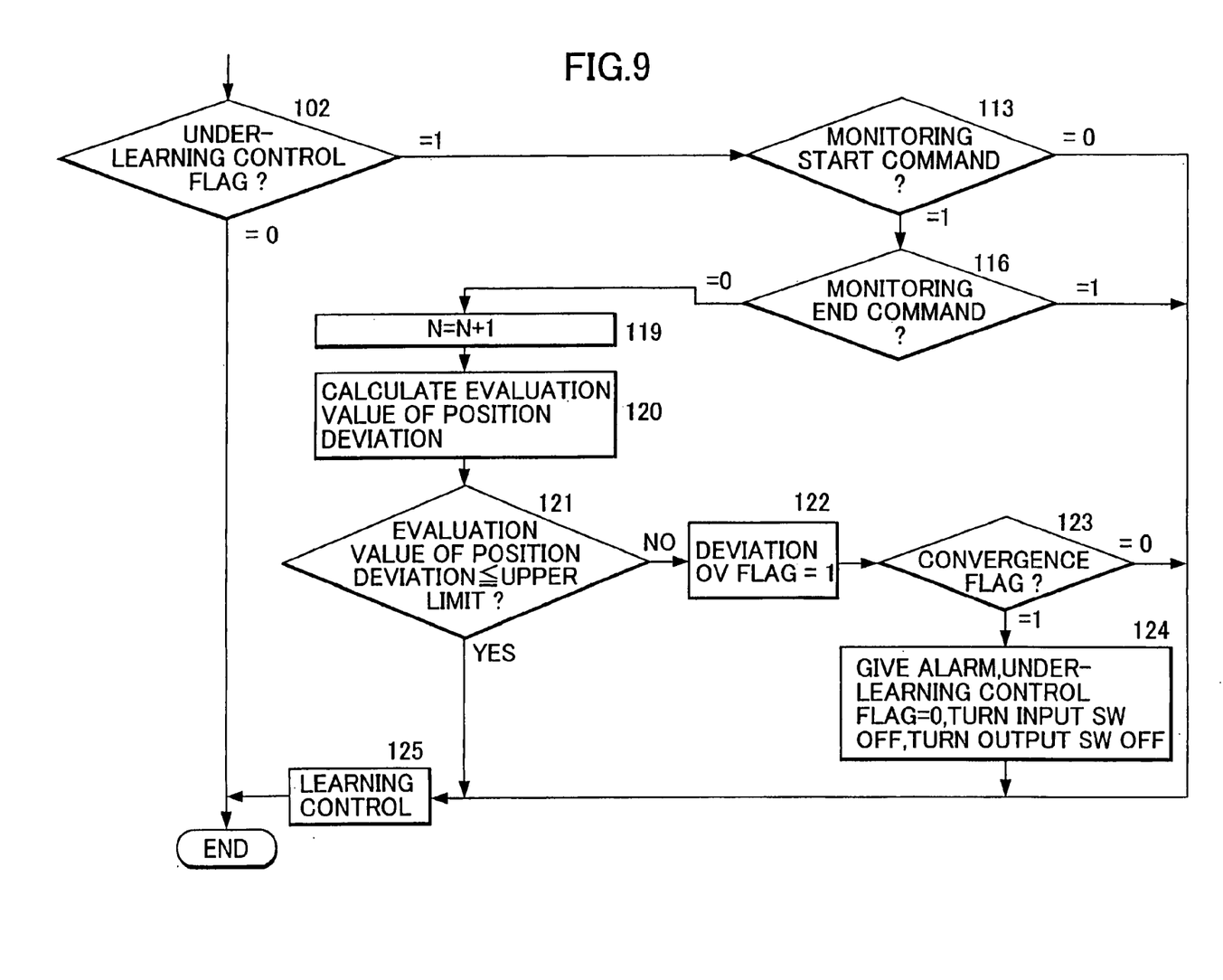
FIG. 9 is a flowchart showing processing for monitoring in a section using external signals according to a fifth embodiment of the invention, explaining.

The start and end of monitoring can be also controlled with the signal from the external apparatus 12, as shown in the flowchart of FIG. 9. In this case, the start and end of monitoring is settled in response to the command from the external apparatus 12. Therefore, Step 113 is changed into a step for process of determining whether or not there is a monitoring start command, Step 116 is changed into a step for process of determining whether or not there is a monitoring end command, and the processing in Steps 112, 114, 115, 117 and 118 are omitted.

There are various types of evaluation value for the position deviation, which include, for example, a mean square value of the position deviation that is obtained by integrating squares of the position deviation and diving the result by the number N of squared position deviations (see Equation 1), mean of absolute values of position deviations (see Equation 2), maximum of the absolute values of the position deviations (see Equation 3), etc.

$$\text{evaluation value} = \sqrt{\frac{\sum_{1}^{N}(\text{position deviation})^2}{N}} \quad (1)$$

$$\text{evaluation value} = \frac{\sum_{1}^{N}|\text{position deviation}|}{N} \quad (2)$$

$$\text{evaluation value} = \max(|\text{position deviation}|) \quad (3)$$

And, it is determined whether the obtained evaluation value is not higher than a preset upper limit value (Step 121). If the obtained value is not higher than the upper limit value, the program proceeds to Step 125, in which learning control processing is executed. If the upper limit value is exceeded by the evaluation value, on the other hand, the deviation OV flag is set to "1" (Step 122), and it is determined whether the convergence flag is "0" or "1" (Step 123). Since the convergence flag is initially set to "0" in Step 106, the program proceeds from Step 123 to Step 125, in which the learning control is performed.

In the next and subsequent periods, the under-learning control flag is set to "1", the monitoring start flag to "1", the monitoring end flag to "0", and the convergence flag to "0", so that processing in Steps 100, 101, 102, 112, 113, 116, 117, 119, 120 and 121 is executed, and processing in Step 121 is followed by processing in Step 125 or by processing in Steps 122, 123 and 125. If the value of the counter M exceeds the preset value Me for settling a preset monitoring end timing in Step 117 after this processing is executed with every given period, the monitoring end flag is set to "1" (Step 118), and the program proceeds to Step 125 for the execution of the learning control.

Since the monitoring end flag is set to "1" in the next and subsequent periods, the program proceeds to Steps 100, 101, 102, 112, 113 and 116, and processing in Step 116 is followed by processing in Step 125 for the learning control.

If it is detected that a learning control end command from the external apparatus 12 is inputted in Step 101 after this processing is executed with every given period, thereafter, it is determined whether the deviation OV flag is "1" or "0" (Step 108). If the flag is "1", it is concluded that there is no convergence, and the convergence flag is set to "0" (Step 109). If the flag is "0", on the other hand, it is concluded that there is convergence, and the convergence flag is set to "1" (Step 110). Then, the under-learning control flag and the counters N and M are respectively set to "0" (Step 111), whereupon the program proceeds to Step 102.

Learning control is performed during the time interval from the learning control start command to the learning control end command. In the monitoring section based on the preset values Ms and Me, during this learning control, the evaluation value of the position deviation is obtained, and it is determined whether this evaluation value is not higher than the preset upper limit value. If the evaluation value of the position deviation exceeds the preset upper limit value in any of the processing periods, the deviation OV flag is set to "1". If the deviation OV flag is "1", the convergence flag is set to "0", which indicates that the position deviation is not converged, in Step 109.

If the learning control start command is then issued again, and if it is detected in Step 100, the processing in Steps 100, 103, 104 and 105 are executed, and processing in Step 105 is followed by processing in Step 107, that is, the processing in Step 106 is skipped. At the end of the preceding learning control cycle, the convergence flag is set to "0" or "1" in Step 109 or 110. Initially, however, the evaluation value of the position deviation frequently exceeds the preset upper limit value, so that the convergence flag is set to "0", and the same processing as aforesaid is carried out.

Every time the learning control start command is inputted, thereafter, the aforesaid processing is carried out, and the learning control is repeatedly performed for the same operation pattern. Thus, there is no case where the evaluation value of the position deviation exceeds the upper limit value in Step 121, the learning control end command is issued without setting the deviation OV flag to "1". When the learning control terminates, the convergence flag is set to "1" in Step 110.

During the learning control based on the next learning control start command, the aforesaid processing is carried out, and the position deviation normally converges to near zero, so that the evaluation value of the position deviation never exceeds the preset upper limit. If the evaluation value exceeds the upper limit for any reason, the program proceeds from Step 121 to Step 122, in which the deviation OV flag is set to "1", and it is determined whether the convergence flag is "0" or "1" (Step 123). Since the convergence flag is set to "1" in this case, the program proceeds from Step 123 to Step 124, in which an alarm is transmitted to the host controller or the numerical control device 1, and the under-learning control flag is set to "0". The input switch 24 for inputting a position deviation to the learning control means 2 and the output switch 25 for outputting the correction data from the learning control means 2 are turned off, whereupon the program proceeds to Step 125. Since the input and output are off in this stage, the present processing is terminated without substantially executing any learning control. In Step 124, the input switch 24 for inputting a position deviation to the learning control means 2 and the output switch 25 for outputting the correction data are turned off to stop the learning control. Alternatively, however, the learning control may be continued by only outputting an alarm in Step 124.

In response to this alarm signal, the numerical control device 1 as the host controller displays a learning control alarm or the like on its display device or the like. Based on this display, an operator performs processing (such as removal of the workpiece during machining) for the alarm. Since the deviation OV flag is set to "1" in Step 122, moreover, the program proceeds from Step 108 to Step 109 so that the convergence flag is set to "0" that is indicative of non-convergence when the learning control end command is outputted. In the next learning control cycle, therefore, the learning control is repeatedly performed to update the correction data without procession of the program from Step 123 to Step 124. Thus, the evaluation value of the position deviation never exceeds the upper limit value, and the aforesaid processing is executed till the end of the learning control section.

According to this first embodiment, as described above, the position deviation converges to near zero without its evaluation value exceeding the preset upper limit value. If the evaluation value of the position deviation exceeds the preset upper limit value again after the learning control section terminates with the convergence flag set to "1", the processing in Step 124 is executed to output an alarm. As this is done, the operator is informed of a reduction of the machining accuracy of the workpiece being then machined, whereby the maintenance of the machining accuracy can be monitored.

The following is a description of a method of setting the preset values Ms and Me for settling the time interval from the start of learning control to the start of monitoring and the time interval from the end of monitoring to the end of learning control, which fix timings for the start and end of monitoring in the aforesaid processing in Steps 114 and 117.

A delay time that ranges from the start of learning control to the start of monitoring and a time interval from the point of time of monitoring stop before the termination of the learning control to the end of the learning control can be previously obtained according to workpiece machining conditions, a machining test, etc. Further, the end of the learning control can be discriminated by the value of the counter M obtained when the processing of FIG. 5 is performed experimentally and the learning control end is outputted so that the learning control terminates. Thus, the preset value Me for determining the monitoring end can be settled by subtracting the number of processing periods each having a time interval obtained in advance from the value of the counter M at the time of termination.

Figure 6:
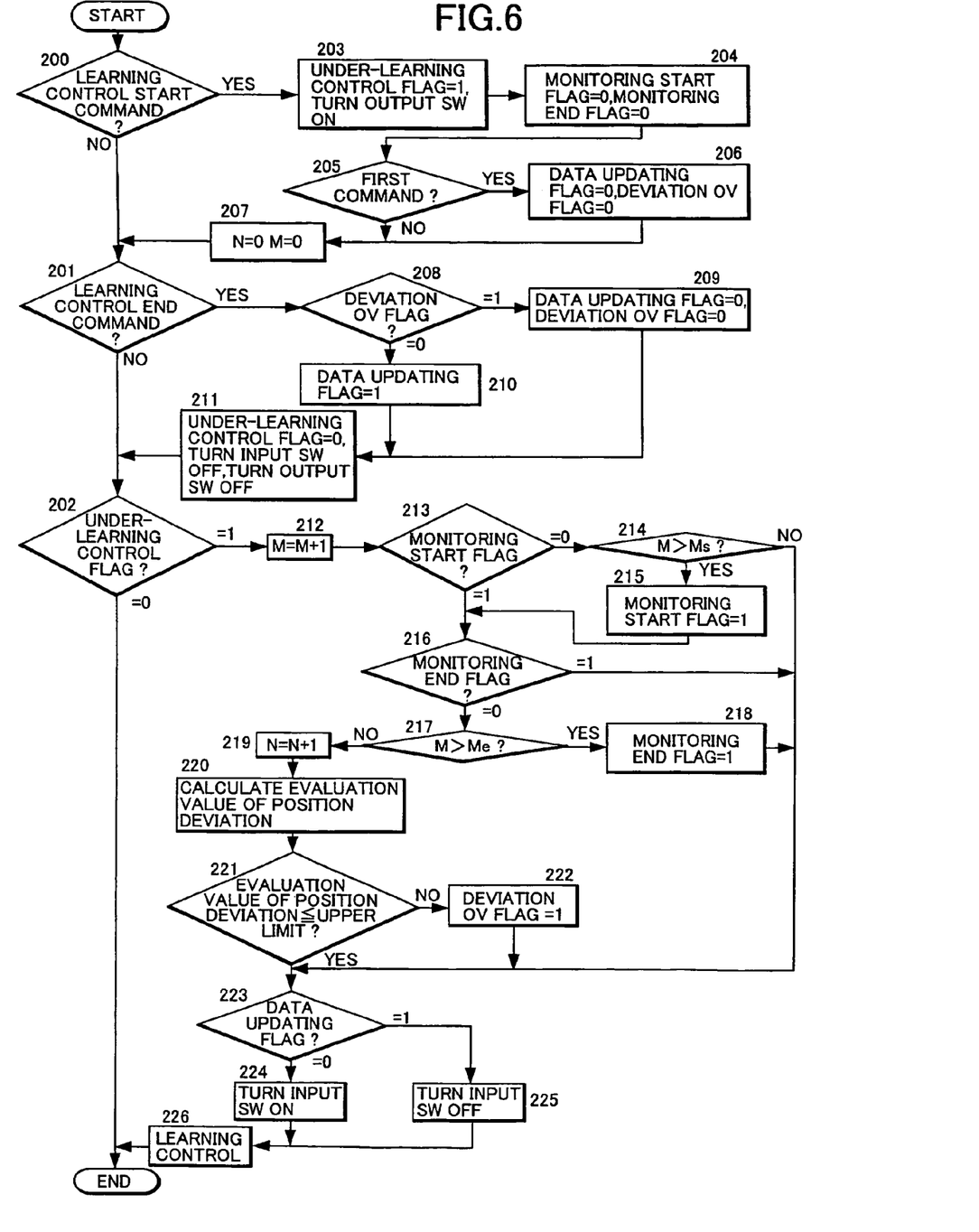
FIG. 6 is a flowchart showing processing for learning control and discriminative execution of renewal of learning control correction data and renewal stopping according to a second embodiment of the present invention.

FIG. 6 is a flowchart showing processing for learning control and discriminative execution of renewal of learning control correction data and renewal stopping according to a second embodiment of the present invention. This processing is carried out by a processor for learning control (processor that executes processing for a servo controller or dedicated processor for learning control means) for each sampling period (position and position loop processing period) in which a position deviation is captured.

As in the first embodiment, it is determined for each processing period whether or not a learning control start command is inputted, whether or not a learning control end command is inputted, and whether or not the under-learning control flag is "1" (Steps 200 to 202). If the learning control start command is issued from an external apparatus 12, the under-learning control flag is set to "1", and an output switch 25 for outputting the correction data from learning control means 2 is turned on (Step 203). Further, a monitoring start flag and a monitoring end flag for controlling the execution of monitoring for the evaluation of the learning control are respectively set to "0" (Step 204).

Then, it is determined whether or not the learning control start command is a first command by determining whether or not the correction data is stored in a learning memory 22 (Step 205). If the start command is the first command, a data updating flag and a deviation OV flag are respectively set to "0" (Step 206), whereupon the program advances to Step 207. If not, on the other hand, the program proceeds from Step 205 to Step 207, in which counters N and M are cleared, respectively. Thereupon, the program proceeds to Step 201.

As the under-learning control flag is set to "1", the program proceeds from Step 202 to Step 212. Since processing in Steps 212 to 222 is identical with the processing in Steps 112 and 122, respectively, of the first embodiment, a description of those processes is omitted.

In the present embodiment, the deviation OV flag is set to "1" and the program proceeds from Step 222 to Step 223 when a preset upper limit value is exceeded by an evaluation value of the position deviation, and the discrimination of the convergence flag and alarm information (Steps 123 and 124) according to the first embodiment are not performed.

The second embodiment differs from the first embodiment in that whether to input the position deviation and update the correction data as the learning control is controlled or only to output the correction data without inputting the position deviation or updating the correction data is determined in Steps 223 and 225 before the learning control is executed.

More specifically, it is determined whether the data updating flag is "1" or "0" (Step 223) before the execution of the learning control (Step 226). If the data updating flag is "0", the input switch 24 for inputting a position deviation to the learning control means 2 is turned on (Step 224), and the learning control for updating the correction data is executed (Step 226). If the data updating flag is "1", on the other hand, the input switch 24 is turned off (Step 225), and the learning control for only outputting the correction data is executed without updating the correction data (Step 226).

If the learning control end command is inputted from an external apparatus (Step 201), it is determined whether the deviation OV flag is "1" or "0" (Step 208). If the deviation OV flag is "1", it is concluded that the upper limit is exceeded by the evaluation value of the position deviation (see Step 222) and that the position deviation is not converged. Therefore, the correction data is updated with the data updating flag kept at "0". Further, the deviation OV flag is also set to "0" (Step 209), the under-learning control flag is set to "0", the input switch 24 for inputting a position deviation to the learning control means 2 is turned off, and the output switch 25 for outputting the correction data from learning control means 2 is turned off (Step 211), whereupon the program proceeds to Step 202. If the learning control is finished with the deviation OV flag kept at "0" and with preset upper limit not exceeded by the evaluation value of the position deviation, moreover, the data updating flag is set to "1" lest the correction data be updated, whereupon the program proceeds to Step 211.

According to the second embodiment, as described above, the deviation OV flag is set to "1" if the preset upper limit value is once exceeded by the evaluation value of the position deviation during the learning control, and the data updating flag is set to "0" so that the learning control is performed. In the next learning control cycle, therefore, the program proceeds from Step 223 to Step 224, in which the input switch 24 for inputting a position deviation to the learning control means 2 is turned on for the learning control. If the learning control is finished without allowing the preset upper limit value to be exceeded by the evaluation value of the position deviation, the data updating flag is set to "1". Thereafter, the program proceeds from Step 223 to Step 225, in which the input of the position deviation to the learning control means 2 through the input switch 24 is stopped, and the learning control is performed without the renewal of the correction data. If the preset upper limit value is once exceeded by the evaluation value of the position deviation during the execution of the learning control where the renewal of correction data is not performed, moreover, the position deviation is inputted so that the learning control is performed with the correction data updated in the next learning control cycle.

Figure 7:
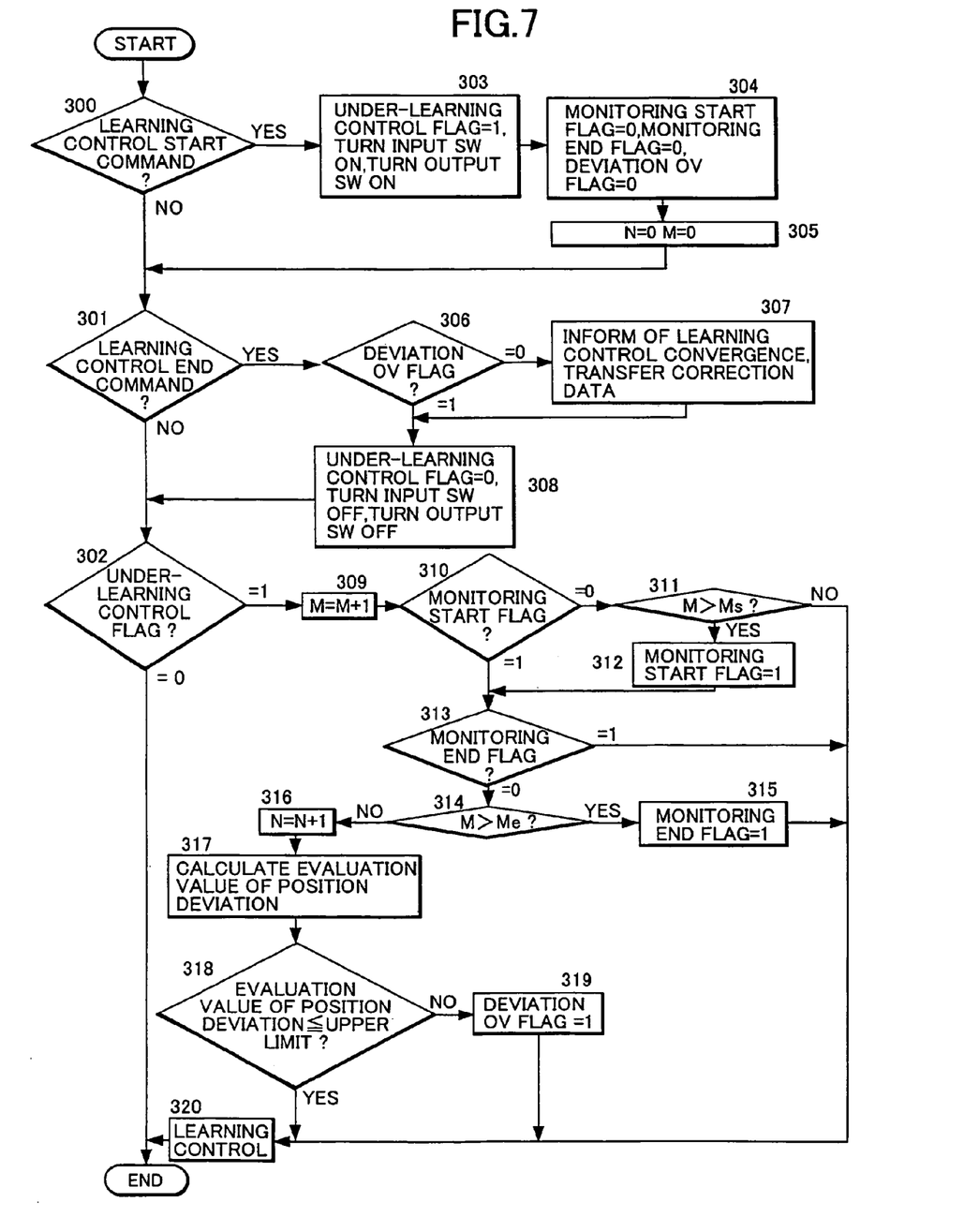
FIG. 7 is a flowchart showing processing for learning control and information of convergence of a position deviation to near zero by the learning control according to a third embodiment of the present invention.

FIG. 7 is a flowchart showing learning control and information processing for convergence of a position deviation to near zero by the learning control according to a third embodiment of the present invention. This processing is carried out by a processor for learning control (processor that executes processing for a servo controller or dedicated processor for learning control means) for each sampling period (position and position loop processing period) in which the position deviation is captured.

In this third embodiment, a host controller and hence the operator are informed of the convergence of the position deviation to near zero by the learning control, and correction data for the time of the convergence is stored in advance for later use.

Also in the third embodiment, it is determined whether or not a learning control start command is inputted, whether or not a learning control end command is inputted, and whether or not the under-learning control flag is "1" (Steps 300 to 302). If the learning control start command is issued from an external apparatus 12, the under-learning control flag is set to "1", an input switch 24 for the position deviation to learning control means 2 is turned on, and an output switch 25 for outputting the correction data from the learning control means 2 is turned on (Step 303). A monitoring start flag, monitoring end flag, and deviation OV flag are respectively set to "0" (Step 304) and counters N and M are cleared (Step 305), whereupon the program proceeds to Step 301.

As the under-learning control flag is set to "1", the program proceeds from Step 302 to Step 309. Since processing in Steps 309 to 319 is identical with the processing in Steps 112 and 122, respectively, of the first embodiment and the processing in Steps 212 to 222, respectively, of the second embodiment, a description of those processes is omitted.

In the third embodiment, the learning control is executed in Step 320 during the time interval from the learning control start command to the learning control end command. In a monitoring section during this learning control, it is determined whether an evaluation value of the position deviation is not higher than a preset upper limit value (Step 318). If the evaluation value is not higher than the upper limit value, the program proceeds directly to the learning control in Step 320. If the upper limit value is exceeded, the deviation OV flag is set to "1" (Step 319), whereupon the program proceeds to Step 320.

If the learning control end command is inputted after the aforesaid processing is executed with every given period (Step 301), it is determined whether the deviation OV flag is "1" or "0" (Step 306). If the deviation OV flag is "1" (i.e., if the upper limit value is once exceeded by the evaluation value of the position deviation), the under-learning control flag is set to "0", the input switch 24 for inputting a position deviation to the learning control means 2 is turned off, and the output switch 25 for outputting the correction data from the learning control means 2 is turned off (Step 308). If the deviation OV flag is "0" and if the upper limit value is not exceeded once by the evaluation value of the position deviation during a learning control monitoring period, on the other hand, the position deviation can be concluded to have converged to near zero. Thus, the information of the position deviation convergence and the correction data are transferred to the host controller (Step 307), whereupon the program proceeds to Step 308.

In the numerical control device 1 as the host controller, the convergence of the position deviation to near zero by the learning control is displayed on its display device or the like through the transferred information of the position deviation control convergence, and the operator is informed of it. The sent correction data is stored in a nonvolatile memory.

The correction data thus stored is transmitted to the learning memory 22 of the servo controller by the numerical control device 1 and stored in a correction memory when re-machining is performed after operation is stopped. By doing this, the learning control can be executed to correct the position deviation so that the position deviation converges to near zero from the start.

Figure 8:
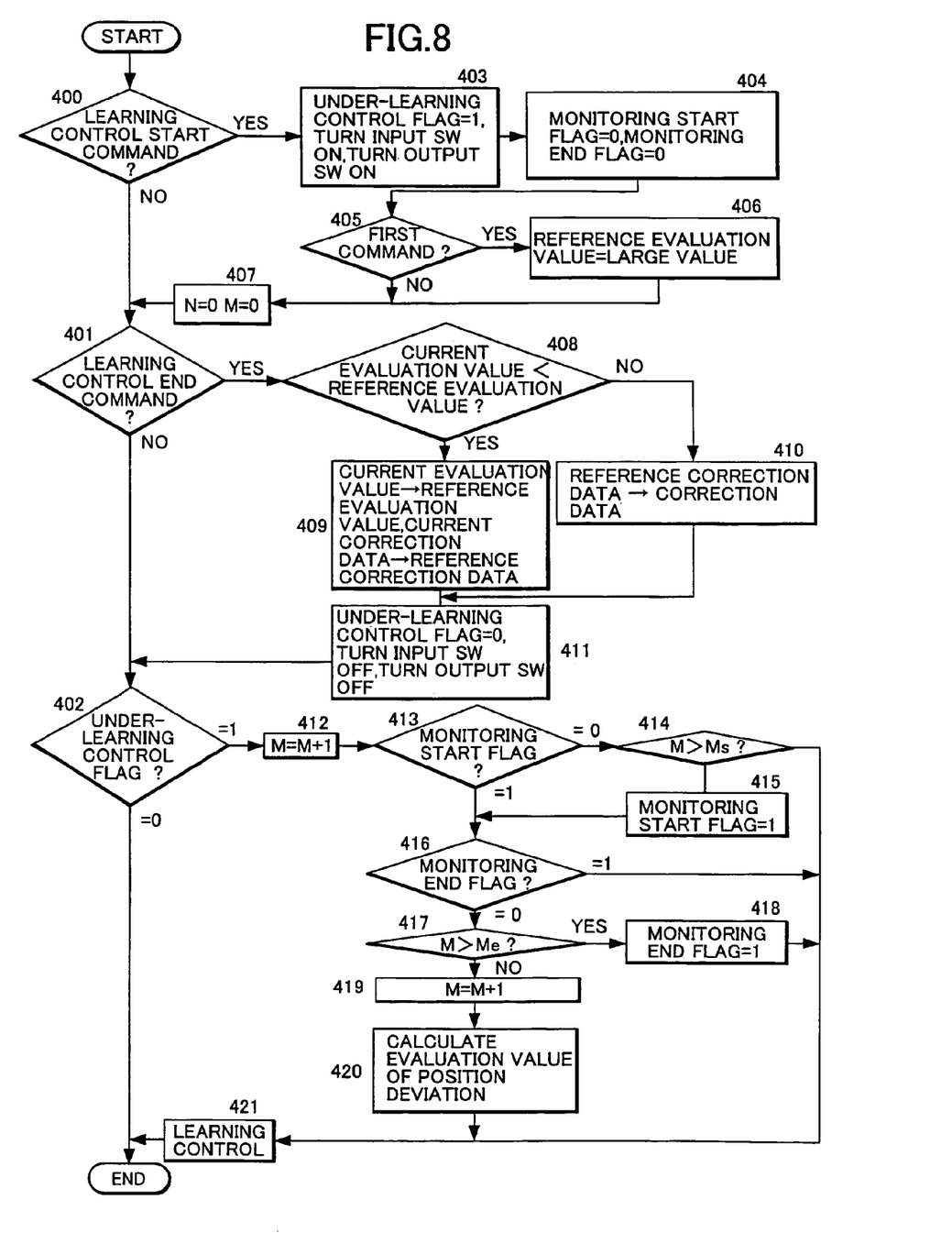
FIG. 8 is a flowchart showing processing for learning control and processing for selecting and storing optimum correction data according to a fourth embodiment of the present invention.

FIG. 8 is a flowchart showing processing for learning control and processing for selecting and storing optimum correction data according to a fourth embodiment of the present invention. This processing is carried out by a processor for learning control (processor that executes processing for a servo controller or dedicated processor for learning control means) for each sampling period (position and position loop processing period) in which a position deviation is captured.

Also in this fourth embodiment, it is determined for each processing period whether or not a learning control start command is inputted, whether or not a learning control end command is inputted, and whether or not the under-learning control flag is "1" (Steps 400 to 402). If the learning control start command is inputted, the under-learning control flag is set to "1", and the input switch 24 for inputting a position deviation to the learning control means 2 and an output switch 25 for outputting the correction data from the learning control means 2 are respectively turned on (Step 403). Further, a monitoring start flag and a monitoring end flag are respectively set to "0" (Step 404). Then, it is determined whether or not the learning control start command is a first command (whether the correction data is not yet stored in a learning memory) (Step 405). If the start learning control command is the first one, a large value (maximum storable value) is stored in a storage section that is provided in a nonvolatile memory of a numerical control device 1 and stores a reference evaluation value (Step 406), whereupon the program proceeds to Step 407, in which counters N and M are cleared, respectively (Step 407). Thereupon, the program proceeds to Step 401. If the start learning control command is not the first one (or if the correction data has already been stored in the learning memory), a reference evaluation value has already been stored, so that the program proceeds from Step 405 to Step 407.

As the under-learning control flag is set to "1", the program proceeds from Step 402 to Step 412, and processing in Steps 412 to 420 is executed. Since the processing in Steps 412 to 420 is identical with the processing in Steps 112 and 120, respectively, of the first embodiment, a description of this processing is omitted. Although an evaluation value of the position deviation is calculated (Step 420), according to this fourth embodiment, however, learning control in Step 421 is started without carrying out determination as to whether the evaluation value is not higher than an upper limit value. In this learning control, the input switch 24 for inputting a position deviation to the learning control means 2 and the output switch 25 for outputting the correction data from the learning control means 2 are respectively turned on, so that learning control is performed such that the position deviation is inputted and the correction data is outputted.

Thereafter, the processing in Steps 400 to 402 and Steps 412 to 421 is executed with every period, and learning control is performed such that the correction data is updated as it is outputted.

If the learning control end command is inputted (Step 401), a current evaluation value of position deviation that is finally obtained in the processing in Step 420 and the reference evaluation value stored in the numerical control device 1 as a host controller are compared with each other (Step 409). If the current evaluation value of position deviation is smaller than the reference evaluation value, the current evaluation value of position deviation and the current correction data then stored in the learning memory 22 are transferred to the numerical control device 1 and stored in its nonvolatile memory (Step 409). If the current evaluation value of position deviation is larger than the reference evaluation value, on the other hand, the reference correction data stored in the nonvolatile memory of the numerical control device 1 is read out and loaded as the correction data into the learning memory 22. In the processing in Steps 409 and 410, the learning memory 22 is loaded with the correction data having a smaller evaluation value of the position deviation, and the evaluation value in association with the correction data loaded in the learning memory 22 is stored as the reference evaluation value.

After the processing in Step 409 or 410 is executed, the under-learning control flag is set to "0", the input switch 24 for inputting a position deviation to the learning control means 2 and the output switch 25 for outputting the correction data from the learning control means 2 are turned off, whereupon the program proceeds to Step 402.

The reference evaluation value and the reference correction data are transferred to the numerical control device 1 as the host controller so that they are loaded into its nonvolatile memory, whereby they can remain without being erased even when power supply to the numerical control device 1 or the servo controller is stopped. If the servo controller itself is provided with the nonvolatile memory, therefore, the reference evaluation value and the reference correction data can be loaded into this memory and need not be transferred to the numerical control device 1.

Since the reference evaluation value and the reference correction data are stored in the nonvolatile memory, as described above, moreover, the learning control start command is determined to be the first one if the reference evaluation value and the reference correction data are once obtained and stored. Thus, the reference correction data to be stored in the nonvolatile memory may be loaded into the learning memory 22, instead of inputting the reference evaluation value in Step 406. If there are a plurality of machined shapes, the reference evaluation value and the reference correction data may be previously stored in the nonvolatile memory in association with each of the machined shapes. When carrying out machining based on learning control for any of the machined shapes, in this case, the reference evaluation value for the corresponding machined shape is selected in Step 406, and the reference correction data for the corresponding machined shape is loaded into the learning memory 22.

Alternatively, moreover, the processing shown in FIG. 8 may be carried out every time the power is switched on without loading the reference evaluation value and the reference correction data into the nonvolatile memory. In this case, the reference evaluation value and the reference correction data are loaded into a volatile memory so that learning control can be performed with optimum correction data.

According to the fourth embodiment described above, the reference evaluation value and the reference correction data are updated with every learning control end (Steps 408, 409 and 410). Alternatively, however, the reference evaluation value and the reference correction data may be updated at the end of the operational program, instead of at the end of the learning control.

Also in the second and third embodiments described above, the start and end of monitoring may be controlled in response to signals from the external apparatus 12, as shown in FIG. 9.

What is claimed is:

1. A servo controller for driving a servomotor in accordance with a command inputted from a host controller, comprising:
   learning control means which includes a learning memory, storing correction data obtained in accordance with a position deviation between a command position inputted from the host controller and a detected position of a driven body driven by the servomotor, and performs learning control by correcting the position deviation in accordance with the correction data stored in the learning memory,
   wherein the learning control means discriminates a learning control start command and a learning control end command inputted from any other external apparatus than the host controller and updates and stores the correction data in the learning memory with every given period as the servomotor is driven during a time interval from the learning control start command to the learning control end command, and
   the drive of the servomotor during the time interval from the learning control start command to the learning control end command is subjected to learning control based on a position command inputted from the host controller and the correction data for each given period stored in the learning memory.

2. The servo controller according to claim 1, which further comprises means for obtaining an evaluation value of the position deviation for evaluating the learning control in accordance with the position deviation value, and wherein the learning control is evaluated from the evaluation value.

3. The servo controller according to claim 2, which further comprises means for issuing an alarm to the host controller when the evaluation value of the position deviation exceeds a given range after once entering the given range.

4. The servo controller according to claim 2, which further comprises means which stops renewal of the correction data when the position deviation or the evaluation value of the position deviation enters a given range and restarts the renewal of the correction data when the given range is exceeded.

5. The servo controller according to claim 2, which further comprises means which informs the host controller of a convergence of the position deviation and transfers the correction data to the host controller when the evaluation value of the position deviation enters a given range.

6. The servo controller according to claim 2, which further comprises means for comparing a stored reference evaluation value of the position deviation with a current evaluation value of the position deviation after the end of the learning control or an operational program, and means which stores a current evaluation value of the position deviation as the reference evaluation value and a current correction data as reference correction data, or transfer these data to said host controller for storing these data in the storage device in the host controller, in case where the current evaluation value of the position deviation is small, and loads the correction data stored in the servo controller or the host controller into said learning memory, in case where the current evaluation value of the position deviation is large.

7. The servo controller according to any one of claims 2 to 6, wherein the evaluation value of the position deviation is a mean square value of the position deviation, a mean of absolute values of position deviations, or a maximum of the absolute values of the position deviations.

8. The servo controller according to any one of claims 2 to 6, wherein the evaluation value of the position deviation is obtained using a position deviation for a time interval between a point of time in a given time after the start of the learning control and a point of time in a given time before the end of the learning control.

9. The servo controller according to any one of claims 2 to 6, wherein the evaluation value of the position deviation is obtained using a position deviation between a monitoring start command and a monitoring end command inputted from the host controller or any other external apparatus than the host controller.

* * * * *